United States Patent [19]

Yamada

[11] 4,261,304

[45] Apr. 14, 1981

[54] INDUCTION SYSTEM FOR MULTI-CYLINDER ENGINE

[75] Inventor: Minoru Yamada, Iwata, Japan

[73] Assignee: Yamaha Hatsukoki Kabushiki Kaisha, Iwata, Japan

[21] Appl. No.: 10,932

[22] Filed: Feb. 9, 1979

[30] Foreign Application Priority Data

Feb. 10, 1978 [JP] Japan .................. 53/14524

[51] Int. Cl.³ .............................. F02B 75/20
[52] U.S. Cl. ............................ 123/59 PC; 123/583; 123/584; 261/23 A
[58] Field of Search ..................... 261/23 A, 43, 41 C; 123/127, 75 B, 580, 583, 584, 59 PC, 432, 442, 308, 52 M

[56] References Cited

U.S. PATENT DOCUMENTS

| | | | |
|---|---|---|---|
| 2,362,879 | 11/1944 | Bicknell | 123/127 |
| 3,245,667 | 4/1966 | Kittler | 261/23 A |
| 3,543,736 | 12/1970 | Suzuki | 123/127 |
| 3,713,630 | 1/1973 | LaPrade | 261/23 A |
| 4,186,706 | 2/1980 | Matsumoto | 123/127 |

FOREIGN PATENT DOCUMENTS 804710 11/1958 United Kingdom ............... 123/127

*Primary Examiner*—Ronald H. Lazarus
*Attorney, Agent, or Firm*—Ernest A. Beutler

[57] ABSTRACT

An induction system for a multi-cylinder internal combustion engine that improves fuel efficiency and reduces the emission of unwanted exhaust gas constituents, particularly at the low and medium load conditions. The engine induction system comprises a plurality of separate carburetor barrels which, at least under some running conditions, serve cylinders separately from each other through main induction passages. One carburetor barrel is provided with a different fuel discharge system than the other carburetor barrels for accomodating a certain engine operating condition. A separate sub-intake system connects this carburetor barrel with other cylinders not normally served by the particular carburetor barrel in question. This sub-intake system has a substantially smaller cross-sectional area in the main intake system so that the charge drawn into the cylinders through the sub-intake system enters at a substantially higher velocity. This improves combustion by creating turbulence under at least some operating conditions. The ratio of flow between the sub-intake system and the main intake system is controlled by a series of throttle valves. In accordance with this invention constructions are provided for delaying the movement of the throttle valve associated with the other carburetor barrels from that associated with the one carburetor barrel for improving the transitional performance of the engine. In certain embodiments of the invention this delay in movement is accomplished by a resilient connection in the throttle linkage.

21 Claims, 8 Drawing Figures

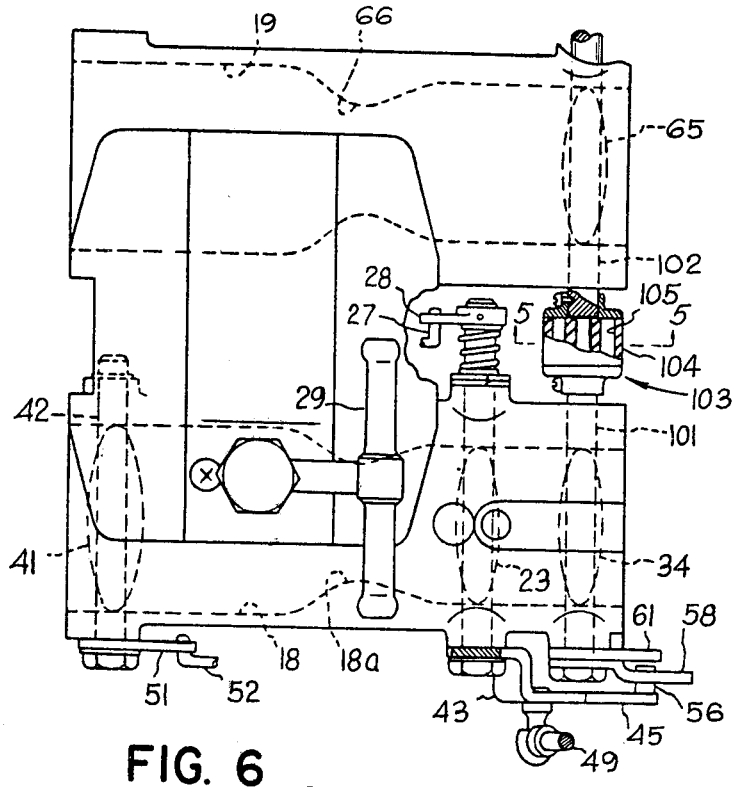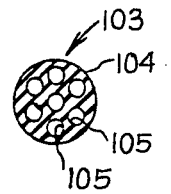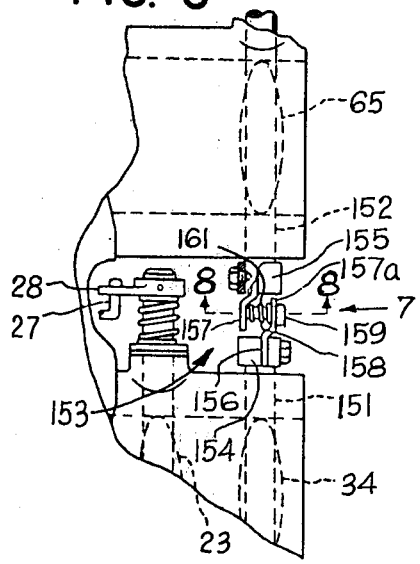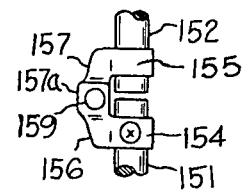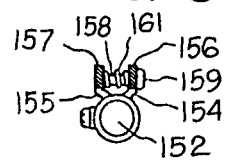

INDUCTION SYSTEM FOR MULTI-CYLINDER ENGINE

BACKGROUND OF THE INVENTION

This invention relates to an induction system for a multi-cylinder engine having multiple carburetor barrels and more particularly to such an induction system that offers improved combustion and efficiency throughout the entire engine range and provides for smooth transitional operation.

Recently it has been discovered that engine operation (both emission of unwanted exhaust gas constituents and fuel economy) can be improved, particularly at idle and low load operation by providing a sub-intake system through which a substantial portion of the induction charge flows to the combustion chambers under these operating conditions. By using a relatively small cross-sectional area induction system turbulence and, if desired, swirl may be generated in the combustion chamber at the time of ignition. As such, smoother and more efficient combustion results under these load conditions.

It has been proposed to control the flow through the sub-intake system by means of a main throttle valve and an auxiliary or sub-throttle valve which operate in sequence so as to cause substantially all of the idle and low load charge requirements to enter the combustion chambers through the sub-intake passage and to provide an increased flow through the main induction passage as the engine load increases. In connection with the adaptation of this concept to multiple chamber engines having multiple carburetor barrels, it has been proposed to provide only one of the carburetor barrels with a system for accomodating certain engine operating conditions. This one carburetor barrel can serve a plurality of chambers through the combined sub-intake passages, all of which are fed from this one carburetor barrel. An example of an application of this principal to a multiple cylinder engine may be found in the copending application of Hiromitsu Matsumoto, Ser. No. 838,353, entitled Control of Carburetor Supplied Induction System, filed Sept. 30, 1977 and assigned to the assignee of this application, such an arrangement being shown specifically in the embodiment of FIGS. 6–10 of that application. With such an arrangement where one carburetor barrel serves a plurality of chambers, it is advantageous if this one carburetor barrel provides the idle and low speed requirements of the engine through the auxiliary or sub-intake passages. During the transitional stage from the running characteristic where the one carburetor barrel serves a multitude of chambers to the point where the individual carburetor barrels are serving their respective chambers, there may be a lag or uneven mixture distribution when the additional carburetor barrels come into operation.

It is, therefore, a principal object of this invention to provide an improved induction system for a multiple cylinder multiple carburetor barrel internal combustion engine.

It is another object of the invention to provide an improved throttle control system for a multiple cylinder multiple carburetor barrel internal combustion engine.

It is a further object of the invention to provide an improved throttle control and induction system for a multiple carburetor barrel multiple cylinder engine wherein one of the carburetor barrels supplies a plurality of cylinders only during certain engine operating characteristics.

SUMMARY OF THE INVENTION

This invention is adapted to be embodied in an internal combustion engine having at least two variable volume chambers in which combustion occurs and first and second charge forming devices which feed respective of the chambers through first and second main induction passages. An auxiliary induction passage connects the first charge forming device with each of the chambers for delivering a charge to each of the chambers. This charge forming device has supply means for supplying a charge adapted to serve a specific engine operating condition to each of the chambers through the auxiliary induction passage. The other charge forming device is devoid of such a specific supply means. Valve means control the ratio of the communication of the charge forming devices with each of the chambers through the respective induction passages. The valve means includes a pair of throttle valves each of which controls the flow through a respective one of the main induction passages. In connection with this invention, means are provided for delaying the movement of the throttle valve which controls the flow through the second main induction passage relative to the other throttle valve in at least one direction for effecting a smooth transition in performance between the condition served by the supply means of the first charge forming device to at least one other operating condition.

BRIEF DESCRIPTION OF THE DRAWINGS

FIG. 4 is a top plan view, with a portion broken away, in part similar to FIG. 2, showing a first embodiment of the invention.

FIG. 5 is a cross-sectional view taken along the line 5—5 of FIG. 4.

FIG. 6 is a partial top plan view, similar to FIGS. 2 and 4, showing a further embodiment of the invention.

FIG. 7 is a side elevational view of the embodiment shown in FIG. 6, taken in the direction of the arrow 7.

FIG. 8 is a cross-sectional view taken along the line 8—8 of FIG. 6.

DETAILED DESCRIPTION OF THE PREFERRED EMBODIMENTS

This invention is adapted to be embodied in a multiple cylinder engine having a plurality of carburetors or carburetor barrels. An induction system consisting of main and sub-intake passages connects the carburetor barrels with respective cylinders. As disclosed in the aforenoted embodiment of copending application Ser. No. 838,353, one carburetor barrel serves a plurality of cylinders through the sub-intake passages during a certain operating condition. In the illustrated embodiment, only two carburetor barrels and their association with two adjacent cylinders of the engine have been shown. It is to be understood that the invention may be used with any number of cylinders, two or greater, and with any number of carburetor barrels. In addition, one carburetor barrel may serve all of the cylinders of an engine for a given operating condition or, alternatively, the one carburetor barrel may serve any number of cylinders less than the total number for a given engine.

Figure 1:
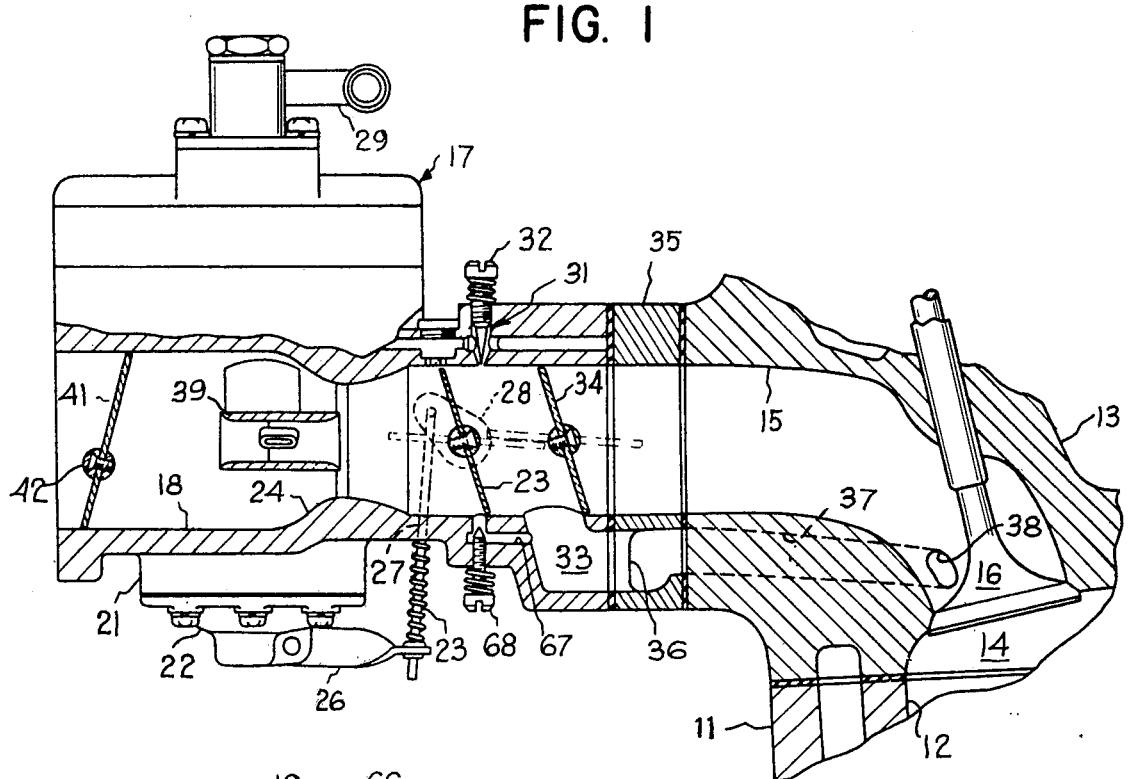
FIG. 1 is a longitudinal sectional view taken through one cylinder of a multi-cylinder engine and specifically the cylinder served by the main carburetor barrel embodying the invention.

Referring now specifically to the drawings and considering first FIG. 1, an engine constructed in accordance with this engine has a cylinder block 11 that is provided with a plurality of cylinder bores 12, only one of which appears in the drawing. Pistons (not shown) are supported for reciprocation in the cylinder bores 12 in a known manner. A cylinder head 13 is affixed to the cylinder block 11 and defines with the cylinder bores 12 and respective pistons, a plurality of combustion chambers 14. For each combustion chamber 14, a main intake passage 15 extends through the cylinder head 13 and the communication of the main intake passage 15 with the respective combustion chamber 14 is controlled in a known manner by an intake valve 16.

A two-barrel carburetor 17 is affixed to the cylinder head 13 for each adjacent pair of combustion chambers 14. The carburetor 17 includes a main barrel 18 and a secondary barrel 19 which serve respective, adjacent intake passages 15. The carburetor barrels 18 and 19 are served by a common float chamber 21 and accelerating pump 22.

A main throttle valve 23 is positioned in the main carburetor barrel 18 downstream of its respective venturi section 24. The main throttle valve 23 is supported in the carburetor body upon a throttle valve shaft 25. The accelerating pump 22 includes an accelerating pump lever 26 that is actuated by means of a link 27 that is connected to a lever 28 affixed to the throttle valve shaft 25 in a known manner.

Fuel is supplied to the float chamber 21 in a known manner by means including an inlet fitting 29.

The carburetor barrel 18 and only this barrel of the carburetor 17 is provided with an idle and low speed fuel discharge circuit, indicated generally by the reference numeral 31, having an adjusting needle 32. Idle and low speed fuel requirements for the two cylinders served by the carburetor 17 is all supplied by the carburetor barrel 18 via a supplemental or sub-intake system now to be described.

The sub-intake system includes an inlet passage 33 formed in the carburetor barrel 18 downstream of the main throttle valve 23 and upstream of a sub-throttle valve 34 that is also positioned in this carburetor barrel. A spacer plate 35, which is positioned between the carburetor 17 and the cylinder head 13 and which may be formed from a heat insulating material is formed with a sub-intake passage 36 that receives a charge from the carburetor sub-intake inlet passage 33 and which branches to cylinder head sub-intake passages 37 serving two adjacent combustion chambers 14. The cylinder head intake passages 37 each terminate in respective sub-intake ports 38 that are juxtaposed to the intake valve 16. The sub-intake passages 37 are of substantially less cross-sectional area than the main intake passages 15 so that a given mass flow through these passages will enter the chambers 14 at a substantially higher velocity. If desired, the sub-intakes passages 37 and ports 38 may be directed so as to also impart a swirl to the intake charge.

In addition to the idle and low speed circuit 31, the carburetor barrel 18 is provided with a main fuel discharge, including a boost nozzle 39. A similar main fuel discharge is also provided in the carburetor barrel 19 which serves the chamber adjacent the chamber 14 shown in FIG. 1.

A choke valve 41 is rotatably supported upon a shaft 42 in only the carburetor barrel 18 upstream of the venturi 24 and boost nozzle 39. As is known, the choke valve 41 provides cold starting enrichment and, as will become apparent, this cold starting enrichment serves all of the chambers fed by the sub-intake passages 33, 36 and 37. Thus, only one carburetor barrel need be provided with a cold starting enrichment device as described in the aforenoted copending application Ser. No. 838,353.

The linkage system for controlling the operation of the main throttle valve 23 and the sub-throttle valve 34 will now be described by particular reference to FIG. 3. A bellcrank 43 is affixed to the throttle valve shaft 25 and has arms 44 and 45. A throttle return spring 46 is interconnected between the arm 45 and a bracket 47 affixed to the carburetor body for returning the throttle valve 23 to its idle position. This idle position is determined by an adjustable screw stop 48 that is juxtaposed to the outer end of the bellcrank arm 45. An operator controlled accelerator link 49 is also affixed to the bellcrank arm 45 for actuating the throttle valve 23 in a known manner.

The choke valve 41 may be operated either manually or automatically and the actuating structure for it is not illustrated since any conventional structure may be used. An unloader mechanism is, however, illustrated which is comprised of a lever 51 that is affixed to the choke shaft 42 and which is pivotally connected to an extending link 52. The link 52 passes with a clearance through a pin 53 that is carried by the arm 44 of the throttle valve shaft bellcrank 43. A spring 54 is transposed between the pin 53 and a shoulder that is stacked to the link 52. As is well known, the unloader mechanism will permit positioning of the choke valve 41 in the desired position without interfering with the operation of the throttle valve 23. However, full opening of the throttle valve 23 will cause the pin 53 to engage the spring 54 and act upon the link 52 to partially open the choke valve 41.

The sub-throttle valve 34 is controlled in sequence with the main throttle valve 23 so that the sub-throttle valve 34 will be progressively opened and to cause a larger portion of the mixture flowing into the chambers 14 to flow through the main intake passages 15 as the primary throttle valve 23 moves to its fully opened position. The mechanism for achieving this result comprises a pin 56 that is carried at the end of the bellcrank arm 43 and which is adapted to engage a cam surface 57 formed on one arm 58 of a bellcrank that is affixed to the sub-throttle shaft 59. The bellcrank has a second arm 61 to which one end of a tension spring 62 is affixed. The opposite end of the tension spring 62 is connected to a bracket 63 that is fixed to the carburetor body so as to urge the arm 61 into engagement with an adjustable stop 64.

A throttle valve 65 is positioned in the carburetor barrel 19 downstream of its venturi section 66 for controlling the flow through the carburetor barrel 19. The throttle valve 65 is affixed to the shaft 59 so that it will be operated simultaneously with the sub-throttle valve 34. The shaft 59 may extend to other carburetor throttle valves (not shown) which serve the same purpose as the throttle valve 65 in the carburetor barrel 19.

FIG. 1 illustrates the throttle valves 23, 34 and 65 in their normal idling positions. In this position the sub-throttle valve 34 and the throttle valve 65 of the carburetor barrel 19 are fully closed. The throttle valve 23 is set at its idling postion and the fuel air mixture dispersed by the idle discharge circuit 31 flows into the sub-intake inlet passage 33. The idling charge is then delivered to the respective chambers 14 through the spacer passage 36 and cylinder head sub-intake passages 37. Due to the relatively small size of the sub-intake passages 37, a high velocity is imparted to the idle mixture which significantly increases the turbulence in the chamber 14 at the time of ignition and thus speeds flame propagation and improves combustion and efficiency. The idle mixture may also be adjusted by controlling the rate of flow through a bypass passage 67 formed in the carburetor body past the main throttle valve 23. An adjustment screw 68 controls the flow through the passage 67.

As the throttle valve 23 is progressively opened, the pin 56 will eventually contact the cam surface 57 of the lever 58 affixed to the sub-throttle valve shaft 59. Up until this time, all of the fuel air mixture for the chambers 14 will be supplied through the sub-intake passages 33, 36 and 37. During this phase of the engine operation, the carburetor barrel 18 will be serving all of the chambers 14 and the carburetor barrel 19 will be inactive.

In a preferred embodiment of the invention, the sub-throttle valve 34 and throttle valve 65 are initially opened when the engine is operating at about one-third of its rated output. The rate of opening of the sub-throttle valve 34 and throttle valve 65 in relation to further opening of the primary throttle valve 23 will depend upon the contour of the cam surface 57.

It should be apparent that as the engine load increases a larger proportion of the mixture will be gradually supplied by the carburetor barrels 19 to their respective chambers and past the open sub-throttle valve 34 to the chamber served by the main intake passage 15. Said another way, each individual carburetor barrel 18 or 19 will begin to supply its respective combustion chamber 14 at the higher load ranges of the engine.

As has been noted, only the carburetor barrel 18 is provided with a choke valve 41. Even though the choke valve 41 is in its fully opened position, the carburetor barrel 18 will have a slightly greater resistance to flow than will the unchoked barrel 19. This can result in uneven mixture delivery to the cylinders served by these barrels if not compensated for.

Figure 2:
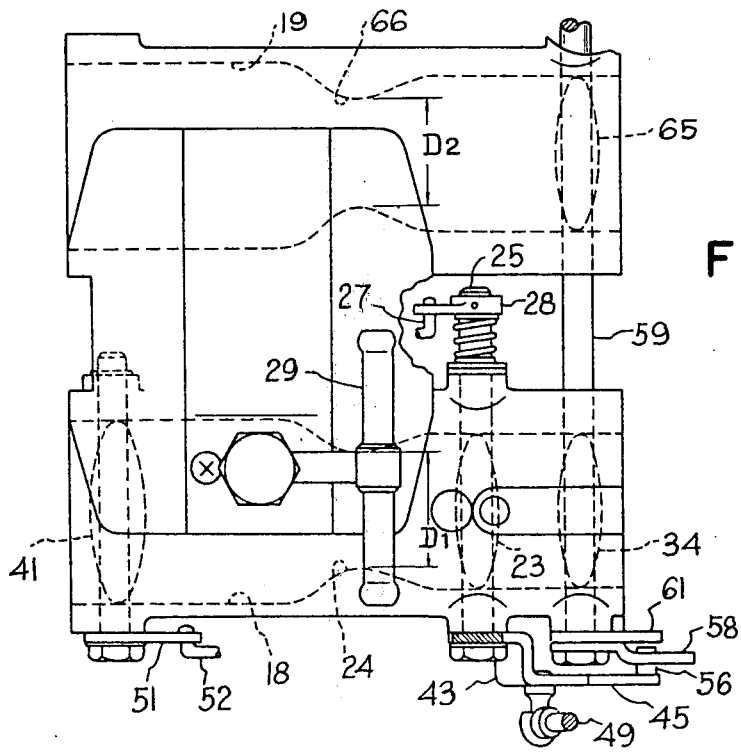
FIG. 2 is a top plan view of one two-barrel carburetor of the induction system constructed in accordance with the invention.

In accordance with one embodiment of the invention, the diameter of the primary barrel venturi 24, indicated by the dimension $D_1$ in FIG. 2 is chosen so as to be slightly larger than the corresponding diameter of the secondary barrel venturi 66, indicated by the dimension $D_2$. The difference in cross-sectional area is chosen so that the total flow resistance through the secondary barrel 19 will be the same as that through the primary barrel 18 when the choke valve 41 is fully opened.

The same effect of compensating for the flow resistance of the choke valve 41 and the barrel 18 may be achieved by positioning the throttle valve 65 of the secondary barrel 19 on the shaft 59 at a retarded position from the sub-throttle valve 34. That is, the throttle valve 65 may be positioned on the shaft 59 in such a way that it is always less fully opened than the sub-throttle valve 34. In this way, the throttle valve 65 will offer a resistance to the flow through the barrel 19 over and above the resistance to flow presented by the sub-throttle valve 34.

In the illustrated embodiment the sub-throttle valve 34 is rigidly fixed to the same shaft as the throttle valve 65 of the barrel 19. This eliminates the necessity for linkage and linkage adjustments.

In some instances the delay in the operation of the throttle valve 65 may be achieved by means of a resilient connection in the linkage between it and the sub-throttle valve 34. This resilient connection will also cause, in addition to compensating for the resistance differences, a smoother transition in engine operation when the cross over is made from running under the sub-intake system to the main intake systems of the individual barrels 18 and 19. The embodiments of FIGS. 4 and 5 and of FIGS. 6-8 show two such possible resilient connections. Because only the connection between the sub-throttle valve 34 and throttle valve 65 is different in these embodiments only this portion of the construction will be described in detail.

Figure 3:
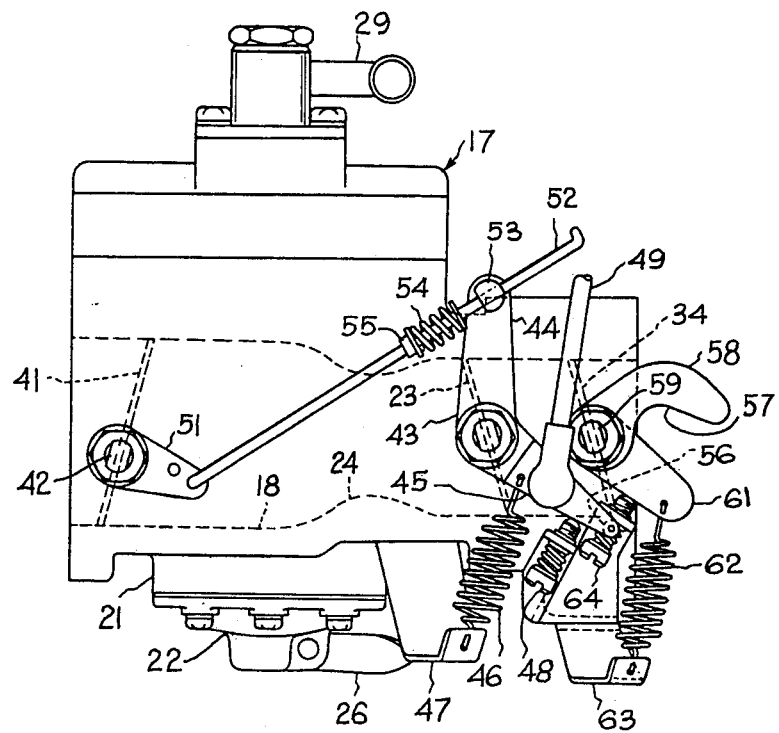
FIG. 3 is a side elevational view of the carburetor shown in FIG. 2.

Elements that are the same as in the embodiments of FIGS. 1-3 have been identified by the same reference numerals and these elements will not be described again, except where necessary to understand the additional embodiments.

Referring first to the embodiment of FIGS. 4 and 5, the sub-throttle valve 34 is affixed to a shaft 101 that is rotatably supported in the carburetor barrel 18. The throttle valve of the barrel 19 is, in a like manner, affixed to a shaft 102 that is rotatably supported in the barrel 19. The shafts 101 and 102 are coaxially with each other and are connected by means of a resilient connection, indicated generally by the reference numeral 103. The resilient connection 103 includes a cylindrical body 104 of elastomeric material that is formed with a plurality of bores 105 that extend either coaxially with or parallel to the axis of the shafts 101 and 102.

In operation of this embodiment, the resilient connection 103 will yield torsionally upon the exertion of a rotational force to the shaft 101 so that the opening and closing of the throttle valve 65 will lag slightly from that of the throttle valve 34. Thus, the transitional operation between the time when the main fuel discharge of the barrels 18 and 19 are serving the cylinders and when the idle discharge 31 of the barrel 18 is serving the cylinders will be improved.

Referring now to the embodiment of FIGS. 6-8, the sub-throttle valve 34 is affixed to a shaft 151 that is journalled in the barrel 18 and the throttle valve 65 is affixed to a shaft 152 that is with each other and are resiliently connected by means of a connection, indicated generally by the reference numeral 153.

The connection 153 includes a collar 154 affixed to the shaft 151 and a corresponding collar 155 shaft fixed to the adjacent end of the shaft 152. The collars 154 and 155 have offset arms 156 and 157, respectively which are spaced apart in the direction of rotation of the shafts 151 and 152. A pin 158 is affixed to the arm 157 and extends through a bore in the arm 156, with a slight clearance. The pin 158 is formed with a head 159 that is adapted to abut the arm 156 when the throttle valves 34 and 65 are in their idle position. A coil compression spring 161 encircles the pin 158 and bears against the facing surfaces of the arms 156 and 157.

When the sub-throttle valve 34 is opened by the linkage, as previously described, the shaft 151 may rotate slightly relative to the shaft 152 through compression of the spring 161. Thus, opening of the throttle valve 65 will lag slightly relative to the opening of the sub-throttle valve 34. Hence, the delay of opening provides smoother transitional operation.

Upon closure of the throttle valve 34, the throttle valve 65 of the barrel 19 will also be moved toward its closed position, with some lag being permitted by the spring 161. The contact of the head 159 of the pin 158 with the lever arm 156 will insure that the throttle valve 65 is moved to its full idle position after the throttle valve 34 has been moved to its full idle position.

It is to be understood that the foregoing description is that of preferred embodiments of the invention and that various changes and modifications may be made without departing from the spirit and scope of the invention as defined by the appended claims.

I claim:

1. In an internal combustion engine having at least two variable volume chambers in which combustion occurs, a first charge forming device, a second charge forming device, first and second main induction passages, said first main induction passage connecting said first charge forming device with only a first of said chambers, said second main induction passage connecting said second charge forming device only with a second of said chambers, an auxiliary induction passage connecting said first charge forming device with each of said chambers for delivering a charge from said first charge forming device to each of said chambers, said first charge forming device having supply means to supply a charge adapted to serve a specific engine operating condition for each of said chambers, said second charge forming device being devoid of such a specific supply means, and valve means for controlling the rate of communication of said charge forming devices with said chambers through the respective induction passages, said valve means including a pair of throttle valves, each of said throttle valves controlling the flow through a respective one of said induction passages, the improvement comprising means for delaying the movement of the throttle valve which controls the flow through said second main induction passage relative to the throttle valve controlling the flow through said first main induction passage in at least one direction.

2. An internal combustion engine as set forth in claim 1 wherein the means for delaying the movement comprises means for delaying the movement in the opening direction.

3. An internal combustion engine as set forth in claim 1 wherein the means for delaying the movement comprises a resilient connection in the linkage between the throttle valves.

4. An internal combustion engine as set forth in claim 3 wherein the resilient connection comprises a torsional spring.

5. An internal combustion engine as set forth in claim 3 wherein the resilient connection comprises a spring biased lost motion connection.

6. An internal combustion engine as set forth in claim 1 wherein the supply means supplies the fuel air mixture for the idle condition of the engine.

7. An internal combustion engine as set forth in claim 6 wherein the auxiliary induction passage has a substantially lesser cross-sectional flow area than the main induction passages.

8. An internal combustion engine as set forth in claim 7 wherein the first charge forming device includes a primary throttle valve positioned upstream from the throttle valve controlling the flow through the first main induction passage, the inlet to the auxiliary induction passage being positioned between the throttle valves associated with said first charge forming device.

9. An internal combustion engine as set forth in claim 8 wherein the means for delaying the movement comprises a resilient connection in the linkage between the throttle valves.

10. An internal combustion engine as set forth in claim 9 wherein the resilient connection comprises a torsional spring.

11. An internal combustion engine as set forth in claim 9 wherein the resilient connection comprises a spring biased lost motion connection.

12. A carburetor for a compound induction system of an engine having a pair of main induction passages and an auxiliary induction passage of substantially lesser cross-sectional area than said main induction passages, said carburetor comprising first and second barrels adapted to be disposed coaxially with said first and second main induction passages respectively, one of said carburetor barrels providing an auxiliary induction system inlet adapted to be in communication with said auxiliary induction passage, a first throttle valve positioned in said one carburetor barrel upstream of said auxiliary induction system inlet, second and third throttle valves positioned in respective of said carburetor barrels for controlling the flow therethrough, said second and third throttle valves being rotatable about a common axis, and linkage means for progressively opening said first throttle valve prior to opening of said second and third throttle valves.

13. An internal combustion engine as set forth in claim 12 wherein the second throttle valve is downstream of the first throttle valve in the one carburetor barrel.

14. An internal combustion engine as set forth in claim 12 further including means for connecting the second and third throttle valves for rotation with each other, said means including an resilient connection for effecting a delay in the opening of the third throttle valve relative to the second throttle valve.

15. An internal combustion engine as set forth in claim 12 wherein the second and third throttle valves are affixed to a common shaft.

16. An internal combustion engine as set forth in claim 13 wherein the effective cross-sectional area of the second barrel is the same as the effective cross-sectional area of the first barrel.

17. An internal combustion engine having a plurality of variable volume chambers in which combustion occurs, a plurality of main intake passages each communicating with a respective chamber through a respective main intake port for delivering a charge thereto, a plurality of carburetor barrels each serving at least one respective chamber through its respective main intake passage, certain of said carburetor barrels being out of communication with the respective main intake passages of certain of said chambers, the improvement comprising a plurality of auxiliary intake passages each communicating with a respective chamber through a respective auxiliary intake port, said auxiliary intake passages having an effective cross-sectional area substantially less than the effective cross-sectional area of said main intake passages for causing a given mass flow of charge through said auxiliary intake port to enter the respective chamber at a substantially greater velocity than the charge entering from the respective main intake port, at least one of said carburetor barrels being provided with a specific fuel discharge system for discharging from said one carburetor barrel mixture particularly adapted for a particular condition of engine operation, at least one of the other of said carburetor barrels being devoid of such a specific fuel discharge system, means for communicating the auxiliary intake passage of the chamber served by said one carburetor barrel and the auxiliary intake passage of a chamber served by said other carburetor barrel with the discharge of said one carburetor barrel for delivering the specific mixture of said one specific fuel discharge system to said one chamber and said other chamber from said carburetor barrel having said specific fuel discharge system, valve means for controlling the ratio of communication of said ports with said chambers during a given cycle of operation of said engine said valve means comprising a throttle valve positioned in the one carburetor barrel downstream of the point of fuel discharge of the one carburetor barrel, control valves positioned in each of the carburetor barrels, said control valves being disposed coaxially with each other, and linkage means for opening said throttle valve prior to opening of said control valves.

18. An internal combustion engine as set forth in claim 17 wherein the control valve of the one carburetor barrel is disposed downstream of the throttle valve.

19. An internal combustion engine as set forth in claim 18 wherein the control valve and throttle valve of the one carburetor barrel are disposed in the carburetor housing.

20. An internal combustion engine as set forth in claim 17 wherein the control valves of the carburetor barrels are all fixed to a common shaft.

21. An internal combustion engine as set forth in claim 17 wherein the control valves of the carburetor barrels other than the one carburetor barrel are affixed to the control valve of the one carburetor barrel by means including a resilient connection.

* * * * *

UNITED STATES PATENT AND TRADEMARK OFFICE
CERTIFICATE OF CORRECTION

PATENT NO. : 4,261,304

DATED : April 14, 1981

INVENTOR(S) : Minoru Yamada

It is certified that error appears in the above—identified patent and that said Letters Patent is hereby corrected as shown below:

Col. 6, line 47, after "is" insert --- journalled in the barrel 19. The shafts 151 and 152 are coaxially ---

*Signed and Sealed this*

*Fifteenth* Day of *September 1981*

[SEAL]

*Attest:*

*Attesting Officer*

GERALD J. MOSSINGHOFF

*Commissioner of Patents and Trademarks*